Patented Mar. 9, 1943

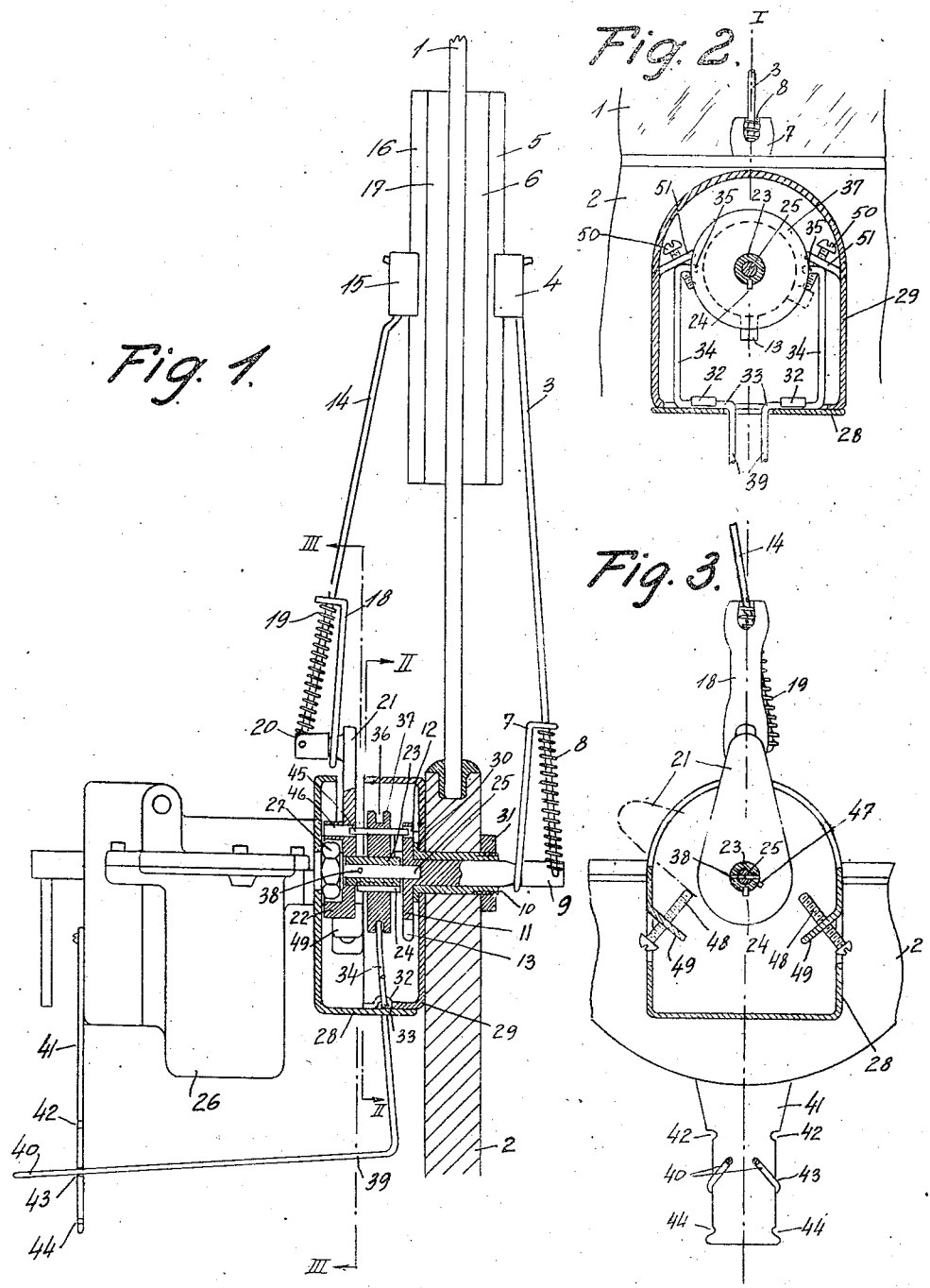

2,313,201

UNITED STATES PATENT OFFICE 2,313,201

WINDSHIELD CLEANER MECHANISM FOR VEHICLES OR VESSELS

Poul Henning Klein, Copenhagen, Denmark; vested in the Alien Property Custodian

Application March 22, 1939, Serial No. 263,484 In Denmark March 22, 1938

2 Claims. (Cl. 15—256)

My invention relates to a wind shield cleaner mechanism for vehicles or vessels and particularly for motor cars.

The known cleaners or wipers are arranged on the outer side of the wind shield or wind shield glass of the motor car and are driven by a vacuum motor or a small electric motor on the inner side of the wind shield; however, it is advisable also to have a wiper on the inner side of the wind shield to wipe off the moisture. For this purpose the two cleaners should oscillate together on the wind shield, so that they obstruct the driver's clear and free view as little as possible during their movement.

Further the two wipers, the outer one and the inner one respectively, can be coupled to the driving device, separately or together, so that the outer wiper can work alone when there is no moisture to be removed on the inner side of the wind shield, and so that the inner cleaner can work alone, or both cleaners together, for instance in case of snow or frost weather.

In damp and cold weather, the interior of the windshield often becomes moist and covered with a foggy film, while the exterior of the windshield remains dry and clear. It is, therefore, desirable to have a windshield wiper operate on the interior of the windshield only. For this purpose, the interior windshield wiper may be disconnected from the exterior wiper, so as to avoid the latter from smearing the outside of the windshield with dirt and dust which might have collected thereon.

The present invention, therefore, contemplates a pair of windshield wipers which act respectively on the inside and outside of the windshield and which may be operated jointly as well as separately by the same driving mechanism.

Further advantages inherent in the invention will become apparent from the following specification and the accompanying drawing, which illustrates, by way of example, a preferred embodiment of the invention.

In the drawing:

Fig. 1 is a side view of a device according to the invention, partly in section, taken along the line I—I of Figs. 2 and 3.

Fig. 2 shows a section according to the line II—II in Fig. 1 and

Fig. 3 shows a section according to the line III—III in Fig. 1.

1 indicates the wind shield and 2 part of the frame in which it is mounted. 3 indicates the outer wiper arm which in known manner by means of a clamp 4 is connected with a piece 5 with a rubber or cleaning strip 6 and by means of a clamp 7 and a spring 8 is connected with an axle 9 passing through a box 10 in the frame 2, and with an inner flange or disc 11 with a hole 12 and a flap 13. 14 indicates the inner wiper arm which by means of a clamp 15 is connected with a piece 16 having a felt strip 17 and by means of a clamp 18 and a spring 19 is connected with an axle 20 on an arm 21. The arm 21 is mounted on the bearing sleeve 23 and it is keyed to the drive shaft 25 by means of the wedge 24 and the pin 38. The drive shaft 25 is rotated by the motor 26. The motor is connected to the casing 28 by means of the nut 27. The other half 29 of the casing is mounted on the frame 2 by means of the flange 30 and the nut 31 of the bearing sleeve 10. The casings 28 and 29 provide a bearing 32 for the part 33 of the lever 34 which, by means of the hook 35, engages the groove 36 of the disc 37. The disc 27 is axially displaceable on the bearing sleeve 23.

The lever 39 has formed in one end a handle or clamp 40 which encircles an indicating plate 41 screwed on the motor 26 and fits into indents 42, 43 and 44 on the same. On the disc 37 there is a pin 45, which may fit into the hole 12 in the disc 11 and in a hole 46 in the hub 22, in which there is a wedge groove for the wedge 24, when the hub 22 outside one of its extreme positions is drawn out over the box 23, otherwise the wedge 24 forms a stop for the hub. The extreme positions of the hub are determined by adjusting or abutment screws 48 screwed through bent in flaps 49 on the casing part 28 which screws form the abutment against the arm 21. The movement and extreme positions of the disc 11 are determined by a flap 13 on the disc and by adjusting screws 50 screwed through bent in flaps 51 on the casing part 29.

When the handle 40 is in the shown position in the indent 43 the clamp 33, 34, 39 will carry the coupling disc 37 with the pin 45 into both holes 12 and 46, so that both the outer and the inner wiper will be coupled to and carried along by the shaft 25. If the handle 40 is carried down into the indent 44, the clamp 33, 34, 39 will carry the disc 37 with the pin 45 out of the hole 46, so so that only the inner wiper will be carried along by the shaft 25. If the handle 40 is carried up into the indent 42, the lever 33, 34, 39 will move the disc 37 with the pin 45 out of the hole 46 so that only the outer wiper will be carried along by the shaft 25. The adjusting screws 48 and 50 are adjusted and form a stop for the parts 11 and 22 in the extreme positions of the travel or angle movement determined by the shaft 25 and the driving device 26, so that the parts 11 and 22 when not in gear will remain in their extreme positions.

What I claim is:

1. A wind shield wiper comprising a driven oscillatable shaft, a pair of wiper arms having wiper means for engaging opposite sides of the wind shield journaled on opposite ends of said oscillatable shaft for free rotation thereabout, and manually controllable clutch means slidable axially on said oscillatable shaft for selectively engaging one or both of said wiper arms.

2. A wind shield wiper comprising a driven oscillatable shaft, a pair of wiper arms having wiper means for engaging opposite sides of the wind shield, said wiper arms being provided with hubs journaled on opposite ends of said oscillatable shaft for free rotation thereabout and being provided with indentations, manually controllable clutch means for selectively engaging one or both of said hubs, said clutch means comprising a disc keyed on said oscillatable shaft between said hubs and longitudinally slidable on said shaft, said disc being provided with pins for engaging the indentations of one or both of said hubs.

POUL HENNING KLEIN.